(12) United States Patent
Chuang

(10) Patent No.: US 6,382,364 B1
(45) Date of Patent: May 7, 2002

(54) WHEEL OF A BABY WALKING CART

(75) Inventor: A-Chueh Chuang, Tainan (TW)

(73) Assignee: Jin Sun Gee Plastics Co., Ltd., Tainan (TW)

( * ) Notice: Subject to any disclaimer, the term of this patent is extended or adjusted under 35 U.S.C. 154(b) by 0 days.

(21) Appl. No.: 09/854,684

(22) Filed: May 15, 2001

(51) Int. Cl.[7] ............................................. B60B 33/00
(52) U.S. Cl. ..................... 188/1.12; 16/35 R; 188/19; 188/20
(58) Field of Search .......................... 188/1.12, 19, 20, 188/31; 16/35 R

(56) References Cited

U.S. PATENT DOCUMENTS

| 4,669,580 A | * | 6/1987 | Neville ..................... 188/1.12 |
| 5,040,641 A | * | 8/1991 | Phillips et al. ............. 188/1.12 |
| 5,232,071 A | * | 8/1993 | Kawanabe .................. 188/1.12 |
| 5,368,133 A | * | 11/1994 | Yang ........................ 188/1.12 |
| 5,371,922 A | * | 12/1994 | Chern et al. ................ 16/35 R |
| 5,415,252 A | * | 5/1995 | Estkowski .................. 188/1.12 |
| 5,465,986 A | * | 11/1995 | MacRae ..................... 188/19 |
| 5,632,360 A | * | 5/1997 | Melara ...................... 188/1.12 |
| 6,142,261 A | * | 11/2000 | Yang ........................ 188/20 |

* cited by examiner

Primary Examiner—Christopher P. Schwartz
Assistant Examiner—Devon Kramer
(74) Attorney, Agent, or Firm—Rosenberg, Klein & Lee

(57) ABSTRACT

A wheel for a baby walking cart has wheel parts fitted to two sides of a support member with an axle being passed through the central holes of the wheel parts and an elongated hole of the support member. The axle is also passed through a tubular slide member, which is movably received in the elongated hole, and biased towards a front end of the elongated hole by an elastic member. The wheel members have wavy slowing-down portions on inner circular surfaces. The elastic member acts against a force caused by the forward movement of the cart to push the wheel members towards the rear end of the elongated hole for keeping the wavy portions off slowing-down rods of the support member when the cart is moved along. When the cart is moved along too fast, the wheel members are forced to move towards the rear end of the elongated hole for the wavy portions to contact the slowing-down rods to slow down the cart.

3 Claims, 4 Drawing Sheets

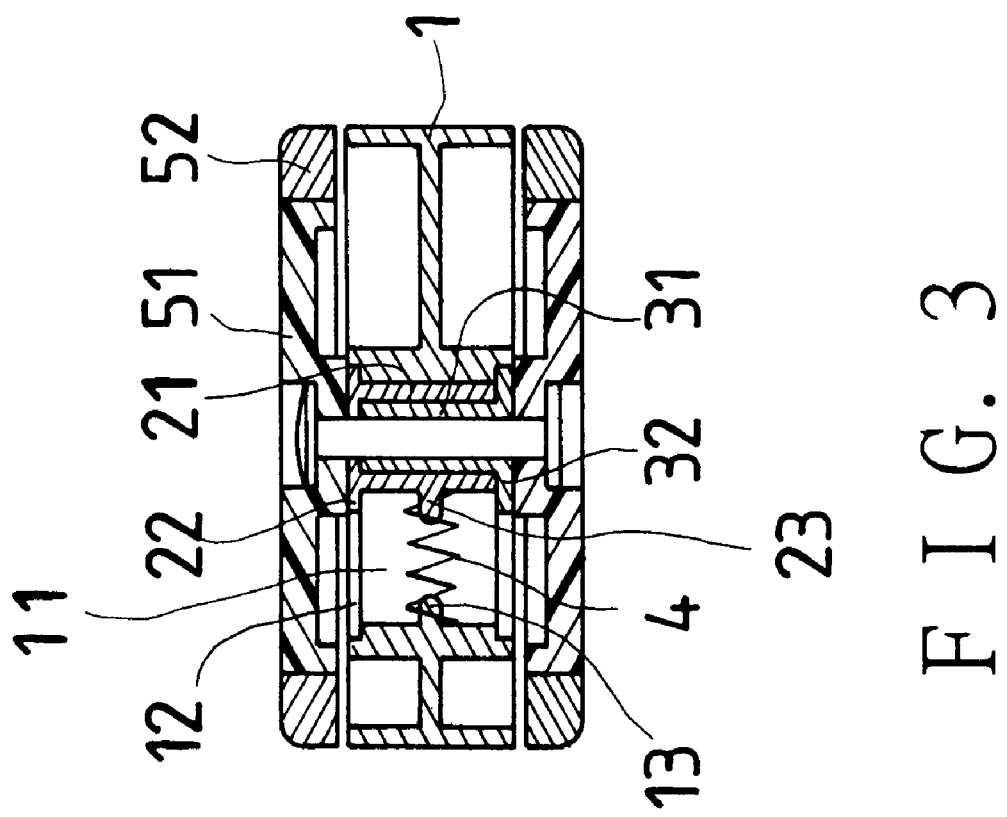
F I G. 3

WHEEL OF A BABY WALKING CART

BACKGROUND OF THE INVENTION

The present invention relates to a wheel of a baby walking cart, and particularly to one which can slow down automatically when a baby walks too fast on the walking cart; thus, the baby is protected from falling over or colliding with objects too hard.

Walking carts are used for helping little children to learn to walk, and the wheels of the carts are usually provided with a automatical brake device for stopping the walking carts when the little children have been walking too fast.

Referring to FIGS. 5 and 6, a conventional wheel for a baby walking cart has a support member 10, an elastic member 20, a slide member 30 and two wheel parts 40.

The support member 10 is fitted to the lower part of a walking cart, and has an elongated guide hole 101, an axle 102, two engaging protrusions 103 and. a receiving hole 104. The engaging protrusions 103 stick out from two sides of the support member 10. The receiving hole 104 is formed at a front portion of the support member 10, and has a confining wall (not numbered).

The wheel parts 40 each has engaging teeth 401 spaced apart on an inner circular surface. And, the slide member 30 has an U shape, and the open end portions each has a through hole 301.

The wheel parts 40 are disposed on two sides of the support member 10 with the axle 102 being passed through the central holes of the wheel parts 40, the through holes 301 of the slide member 30 and the elongated hole 101 of the support member 10; the elastic member 20 is received in the receiving hole 104, and confined between the confining wall (FIG. 6) and the front end of the side member 30 for biasing the sliding member 30 as well as the wheel parts 40 to a front end.

When a baby walks along on the walking cart, the elastic member 20 will act against a force, which results from the forward movement of the cart, and push the slide member 30 as well as the wheel parts 40 rearwards. When the baby walks along too fast on the cart, the force resulting from the forward movement of the cart to push the wheel parts 40 rearwards will be greater than the forward biasing force of the elastic member 20, and consequently the wheel parts 40 will be forced to move to rear part of the support member 10 to engage the engaging protrusions 103 from the engaging teeth 401; thus, the walking cart is stopped to prevent the cart from hitting objects too hard.

However, the wheel with automatical brake is found to have a drawback that it will be stopped too abruptly, and the abrupt stop will give a shock to the baby on the cart. And, the cart might even fill over to make the baby get hurt.

SUMMARY OF THE INVENTION

Therefore, it is an object of the present invention to provide a wheel for a baby walking cart, which will slow down automatically but won't stop abruptly when a baby has been walking too fast on the cart.

The wheel for a baby walking cart of the present invention includes a support member, two wheel members, a tube-shaped slide member and an elastic member.

The support member is connected to a lower part of the walking cart, and has an elongated hole. The wheel members are disposed on a respective side of the support member, and turnable on axle passed through the elongated hole.

The tube-shaped slide member is movably disposed in the elongated hole of the support member with the axle being passed therethrough. The elastic member is connected to a rear end of the elongated hole, and a rear part of the slide member from two ends for biasing the slide member as well as the wheel members towards a front end of the elongated hole.

Furthermore, wavy slowing-down portions are formed on an inner circular surface of each of the wheel members; the elastic member acts against a force resulting from a forward movement of the walking cart to force the wheel members to move rearwards for keeping the wavy slowing-down portions of the wheel members off slowing-down rods on two sides of the support member when the walking cart moves along; the force moving the wheel members towards the rear end of the elongated hole when the walking cart moves along too fast, makes the wavy slowing-down portions contact the slowing-down rods of the support member to slow down the walking cart.

Because of the shape of the wavy slowing-down portions, the walking cart can be slowed down gradually to not give a shock to the baby walking with the cart when the cart is moved along too fast.

BRIEF DESCRIPTION OF THE DRAWINGS

This invention will be better understood by referring to the accompanying drawings, wherein:

FIG. 3 is another cross-sectional view of the wheel for a baby walking cart of FIG. 1, viewed from the top.

DETAILED DESCRIPTION OF THE PREFERRED EMBODIMENT

Figure 1:
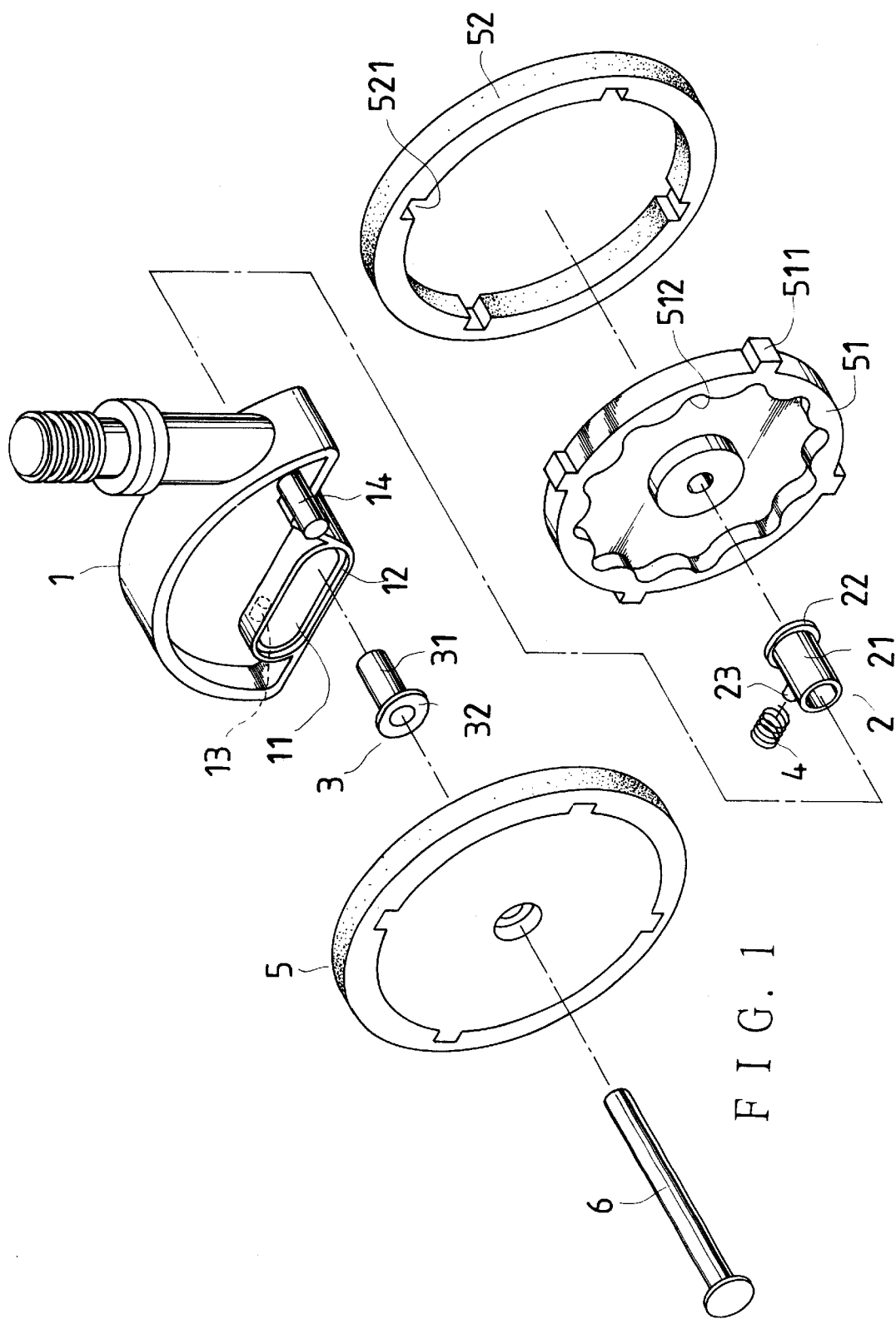
FIG. 1 is an exploded perspective view of the wheel for a baby walking cart according to the present invention.
Figure 4:
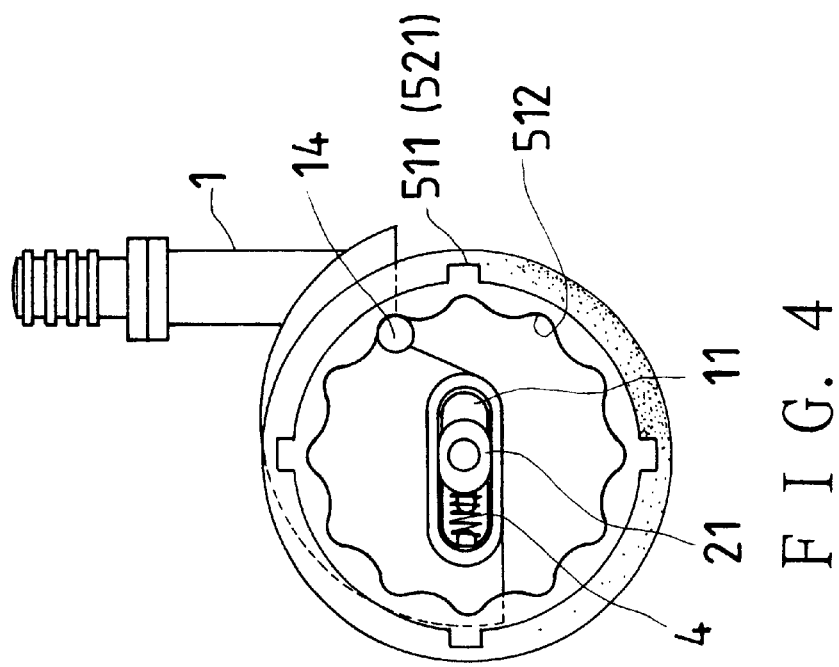
FIG. 4 is a cross-sectional view of the wheel for a baby walking cart of the present invention under fast forward movement.
Figure 2:
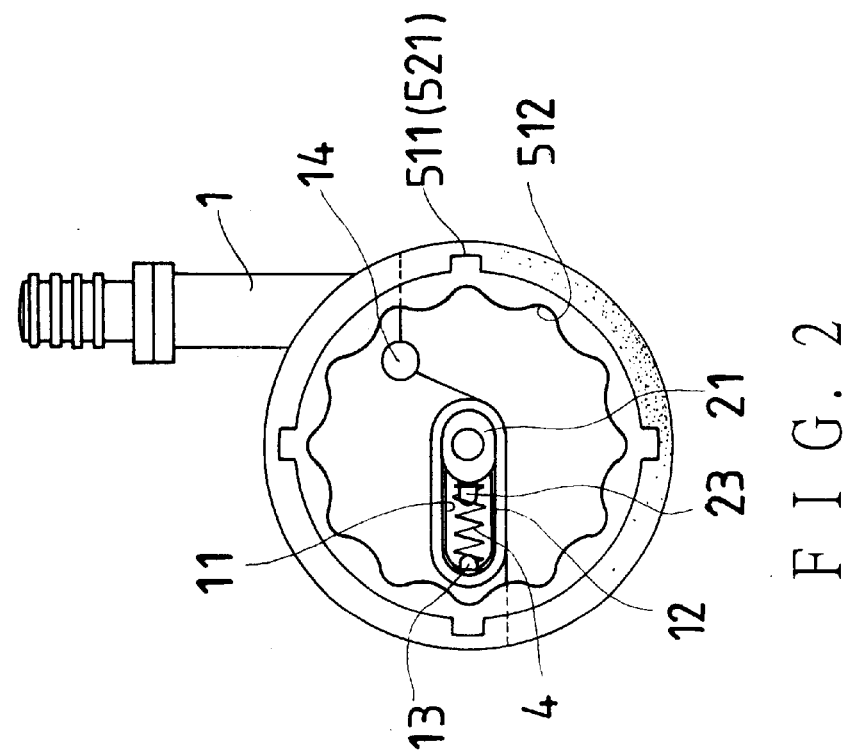
FIG. 2 is a cross-sectional view of the wheel for a baby walking cart of FIG. 1.
Figure 6:
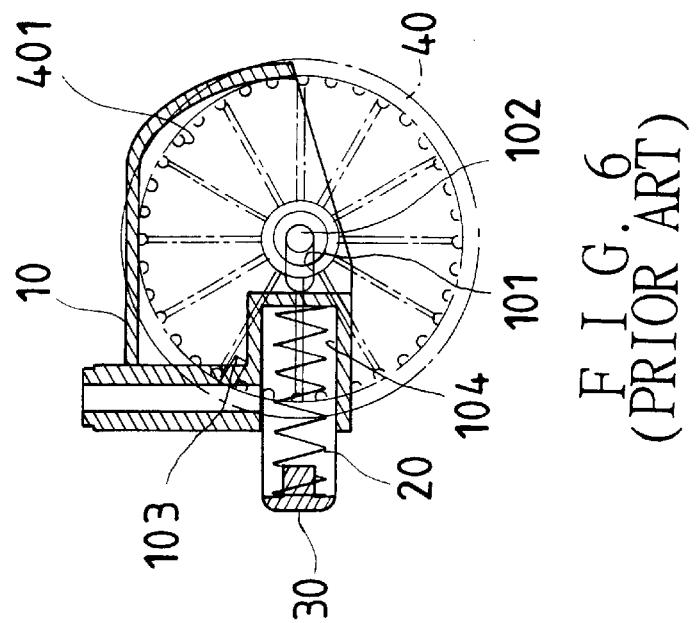
FIG. 6 is a view of the wheel for a baby walking cart in FIG. 5 under fast forward movement.
Figure 5:
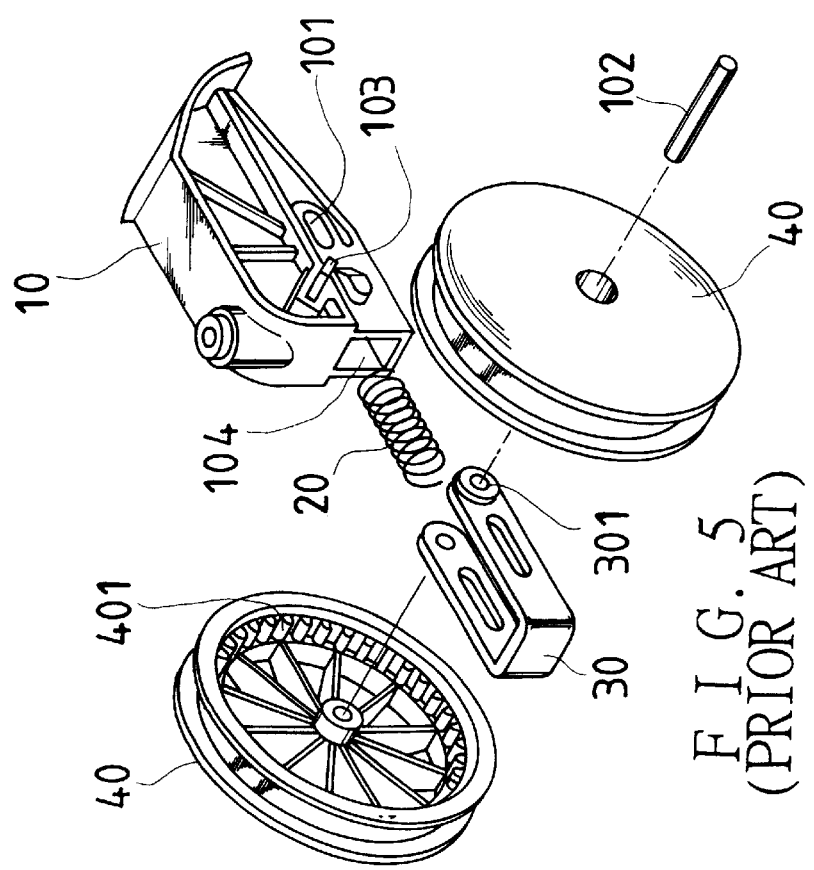
FIG. 5 is an exploded perspective view of the conventional wheel for a baby walking cart in the Background.

Referring to FIG. 1, a wheel for a baby walking cart of the present invention includes a support member 1, a tube-shaped slide member consisting of both a first slide part 2 and a second slide part 3, an elastic member 4, two wheel members 5 and an axle 6.

The support member 1 is disposed at a lower part of the walking cart, and has an elongated hole 11 and two slowing down rods 14 sticking out from two sides. A locating protrusion 13 sticks out from a rear end of the elongated hole 11. The elongated hole 11 has a central annular protrusion (not numbered), and two annular recess portions 12 next to two sides of the central annular protrusion.

The wheel members 5 each has an outer wheel part 52 and an inner wheel part 51. The outer wheel part 52 has several connecting gaps 521 on the inner circular surface. And, the inner wheel part 51 has connecting protrusions 511 on the outer circular surface, and a slowing-down portion 512 on the inner circular surface; the inner wheel part 51 is securely fitted into the outer wheel part 52 with the connecting protrusions 511 connecting a corresponding one of the connecting gaps 521 of the outer wheel part 52; the slowing-down portion 512 is made to have a wavy shape.

The first slide part 2 has a tube portion 21 having an open inner end, and a rim 22 at the outer end. A locating protrusion 23 sticks out from one side of the first slide part 21. The second slide part 3 has a tube part 31 and a rim 32 at the outer end.

The tube part 31 of the second slide part 3 is secured in the tube portion 21 of the first slide part 2. The slide parts 2 and 3 are movably disposed in the elongated hole 11 of the support member 1 with the elastic member 4 being disposed between the rear end of the elongated hole 11 and the slide parts 2 and 3; the locating protrusion 13 of the support member 1 and the locating protrusion 23 of the first slide part 2 are connected to a respective end of the elastic member 4 to locate same in position such that the elastic member 4 biases the slide parts 2 and 3 towards a front portion of the elongated hole 11. The rims 22 and 32 of the first and the second slide parts 2 and 3 are arranged on a respective one of the annular recess portions 12 of the support member 1 for confining the slide parts 2 and 3 in the elongated hole 11.

The wheel members 5 are disposed on two sides of the support member 1 with the axle 6 being passed through the central holes of the wheel members 5, and the tube part 31 of the second slide part 3 for the wheel members 5 to be turnable on the axle 6.

When a baby walks along with the walking cart, the elastic member 4 will act against a force, which results from the forward movement of the cart, and push the slide parts 2 and 3 as well as the wheel members 5 rearwards.

When the baby walks along too fast with the walking cart, the force resulting from the forward movement of the cart to push the wheel members 5 rearwards will be greater than the forward biasing force provided by the elastic member 20. Consequently, the wheel members 5 will be forced to moved to a rearer portion of the support member 1 to contact the slowing-down rods 14 of the support member 1 from the inner wavy slowing-down circular surfaces 512 of the inner wheel parts 51. Thus, the wheel members 5 are slowed down automatically by the friction of the wavy slowing-down surfaces 512 against the slowing-down rods 14.

From the above description, the wheel for a baby walking cart according to present invention can be known to have an advantage over the conventional one: it can be slowed down automatically, and gradually to not give a shock to the baby walking with the help of the cart when the baby walks too fast.

What is claimed is:

1. A wheel for a baby walking cart, comprising
   a support member connected to a lower part of said walking cart; said support member having an elongated hole;
   two wheel members, said wheel members being disposed on a respective side of said support member, turnable on an axle passed through said elongated hole of said support member;
   a tube-shaped slide member movably disposed in said elongated hole of said support member with said axle being passed therethrough; an elastic member being connected to a rear end of said elongated hole and a rear part of said slide member from two ends for biasing said slide member and said wheel members towards a front end of said elongated hole; and characterized by wavy slowing-down portions formed on an inner circular surface of each of said wheel members; said elastic member acting against a force resulting from a forward movement of said walking cart to force said wheel members to move rearwards for keeping said wavy slowing-down portions of said wheel members off slowing-down rods sticking out from two sides of said support member when a speed of said cart is lower than a amount; said force moving said wheel members towards said rear end of said elongated hole when a speed of cart exceeds said amount, making said wavy slowing-down portions contact said slowing-down rods of said support member to slow down said wheel members.

2. The wheel for a baby walking cart as claimed in claim 1, wherein said wheel members each has an inner wheel part having said wavy slowing-down portions, and an outer wheel part; said inner wheel part being fitted into said outer wheel part with connecting protrusions on an outer edge being each connected to a corresponding one of connecting gaps on an inner circular surface of said outer wheel part.

3. The wheel for a baby walking cart as claimed in claim 1, wherein said tube-shaped slide member has a first tube-shaped slide part, and a second tube-shaped slide part fitted into said first slide part; said first and second slide parts each has a rim fitted onto one of annular recess portions formed on edges of said elongated hole of said support member.

* * * * *